US007385549B2

(12) United States Patent
Lovberg et al.

(10) Patent No.: US 7,385,549 B2
(45) Date of Patent: *Jun. 10, 2008

(54) MILLIMETER WAVE PORTAL IMAGING SYSTEM

(75) Inventors: John A. Lovberg, San Diego, CA (US); Vladimir Kolinko, San Diego, CA (US); Robert Bible, Jr., Rancho Santa Fe, CA (US)

(73) Assignee: Trex Enterprises Corp, San Diego, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 11/216,277

(22) Filed: Aug. 30, 2005

(65) Prior Publication Data

US 2006/0017605 A1    Jan. 26, 2006

Related U.S. Application Data

(63) Continuation-in-part of application No. 11/021,296, filed on Dec. 23, 2004, now Pat. No. 7,170,442, and a continuation-in-part of application No. 10/903,129, filed on Jul. 30, 2004, now Pat. No. 7,248,204, and a continuation-in-part of application No. 10/728,432, filed on Dec. 8, 2003, now Pat. No. 7,194,236, and a continuation-in-part of application No. 10/639,322, filed on Aug. 12, 2003, now Pat. No. 6,937,182.

(60) Provisional application No. 60/629,816, filed on Nov. 19, 2004, provisional application No. 60/635,751, filed on Dec. 14, 2004, provisional application No. 60/646,015, filed on Jan. 22, 2005.

(51) Int. Cl.
G01S 13/04 (2006.01)
G01S 13/88 (2006.01)

(52) U.S. Cl. .......................... 342/22; 342/27; 342/179

(58) Field of Classification Search ............. 342/22, 342/27, 179
See application file for complete search history.

(56) References Cited

U.S. PATENT DOCUMENTS

| 7,180,441 B2 * | 2/2007 | Rowe et al. ............... 342/22 |
| 7,248,204 B2 * | 7/2007 | Lovberg et al. ............ 342/22 |
| 2003/0163042 A1 * | 8/2003 | Salmon ...................... 600/436 |
| 2006/0038563 A1 * | 2/2006 | Chisholm et al. .......... 324/309 |

OTHER PUBLICATIONS

Chen et al., "Imaging for Concealed Weapon Detection", IEEE Signal Processing MAgazine, vol. 52, Mar. 2005.*

* cited by examiner

Primary Examiner—Ian J. Lobo
(74) Attorney, Agent, or Firm—John R. Ross

(57) ABSTRACT

A millimeter wave portal imaging system for the detection of concealed weapons, explosives and other contraband items. A preferred millimeter wave imaging system includes a number (such as 64) of millimeter wave detection units each including a frequency scanning antenna and associated electronics. The units are mounted in four posts (16 per post) of a portal structure. Each unit collects frequency dependent beams of millimeter wave radiation from a narrow one-dimensional field of view. The collected radiation from each unit is amplified at the collected frequencies and the amplified signals are separated into frequency dependent bins with a tapped-delay beam-former. These bins are then sampled to produce a one-dimensional image of the antenna field of view. A two dimensional image of a portion of a person passing through the portal is obtained by moving the person (or having the person move) across the field of view of each of the frequency scanning antennas. The images from the antennas can be monitored separately or data from the antennas can be combined with a computer processor to form images of the person.

15 Claims, 14 Drawing Sheets

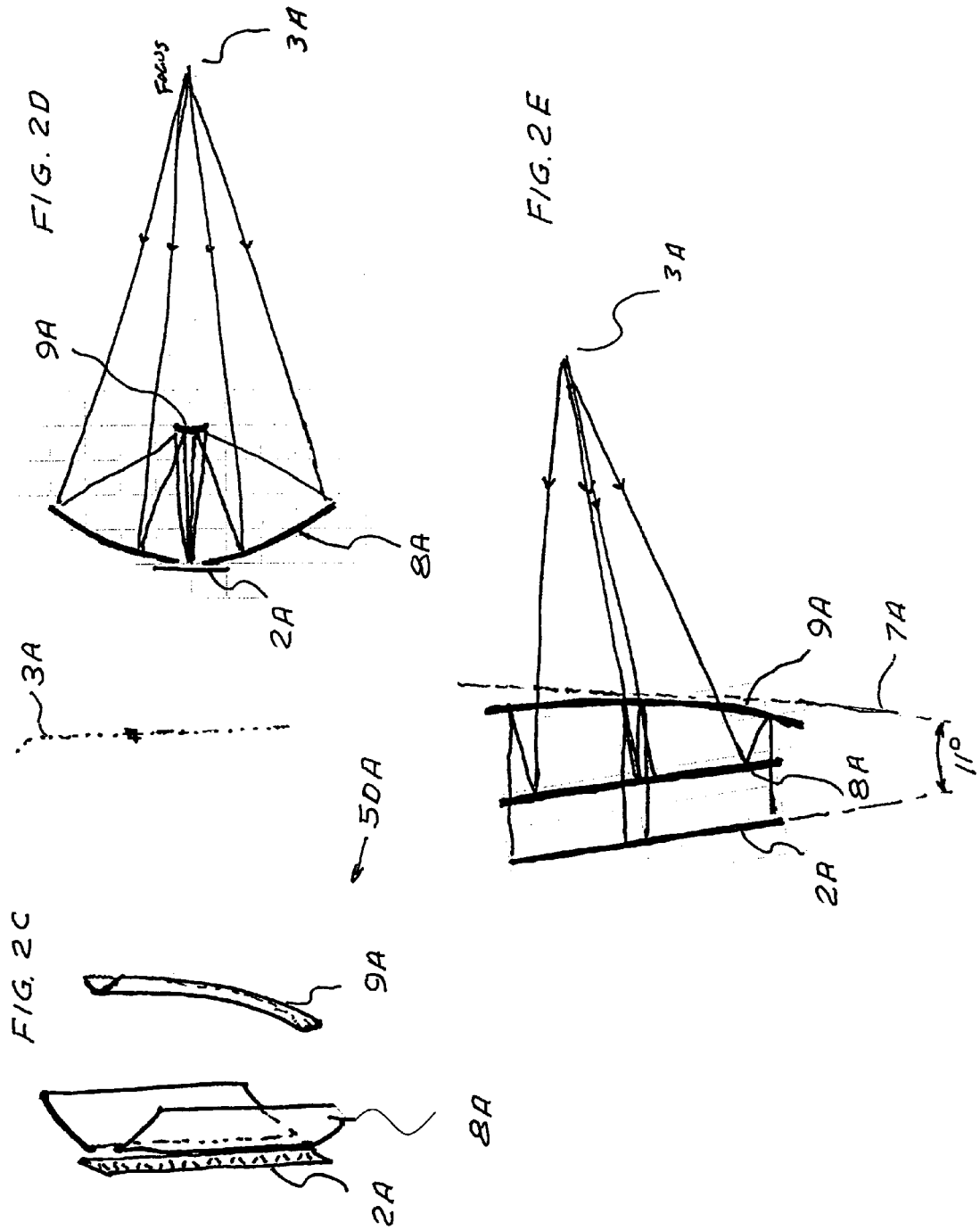

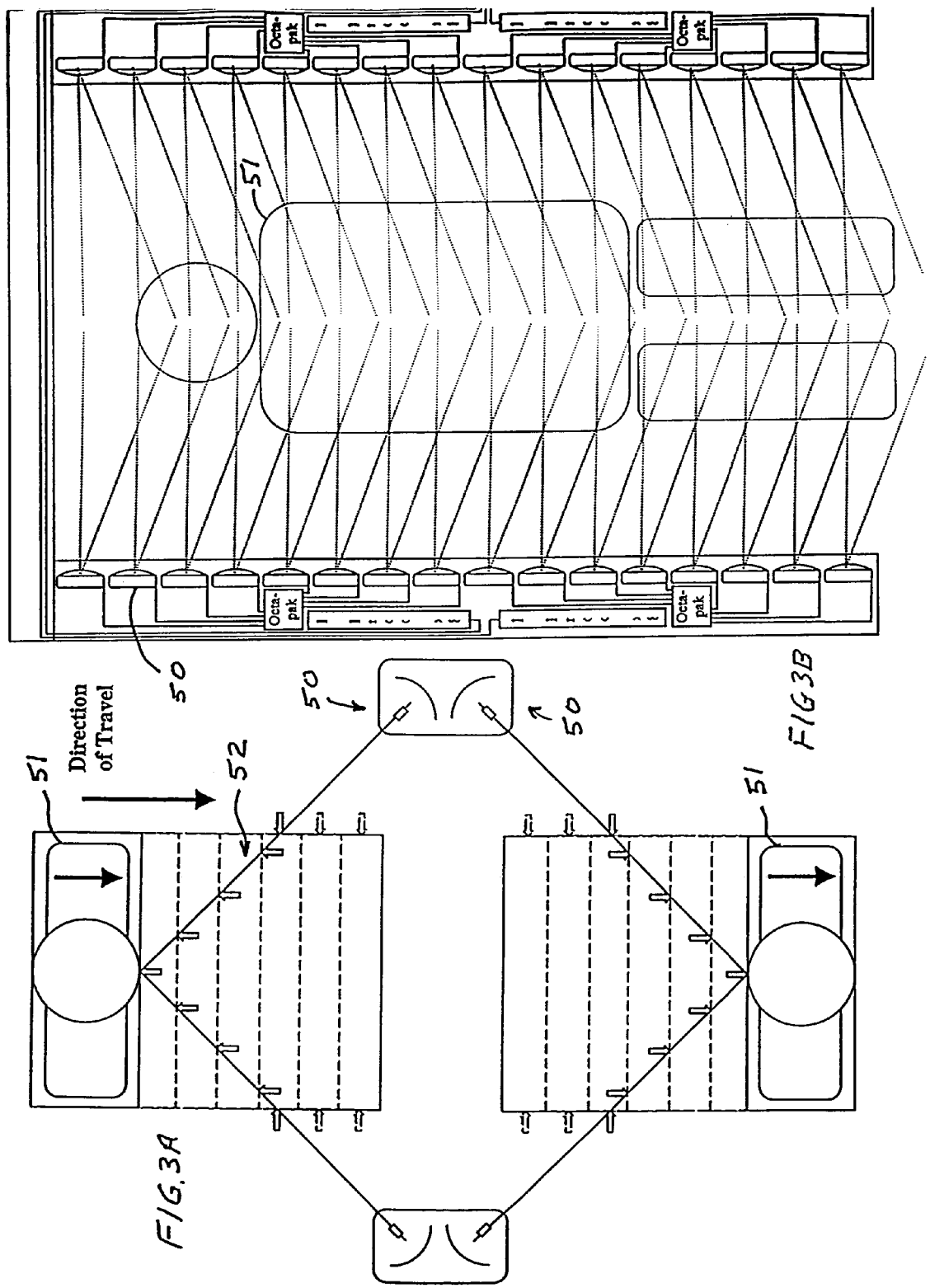

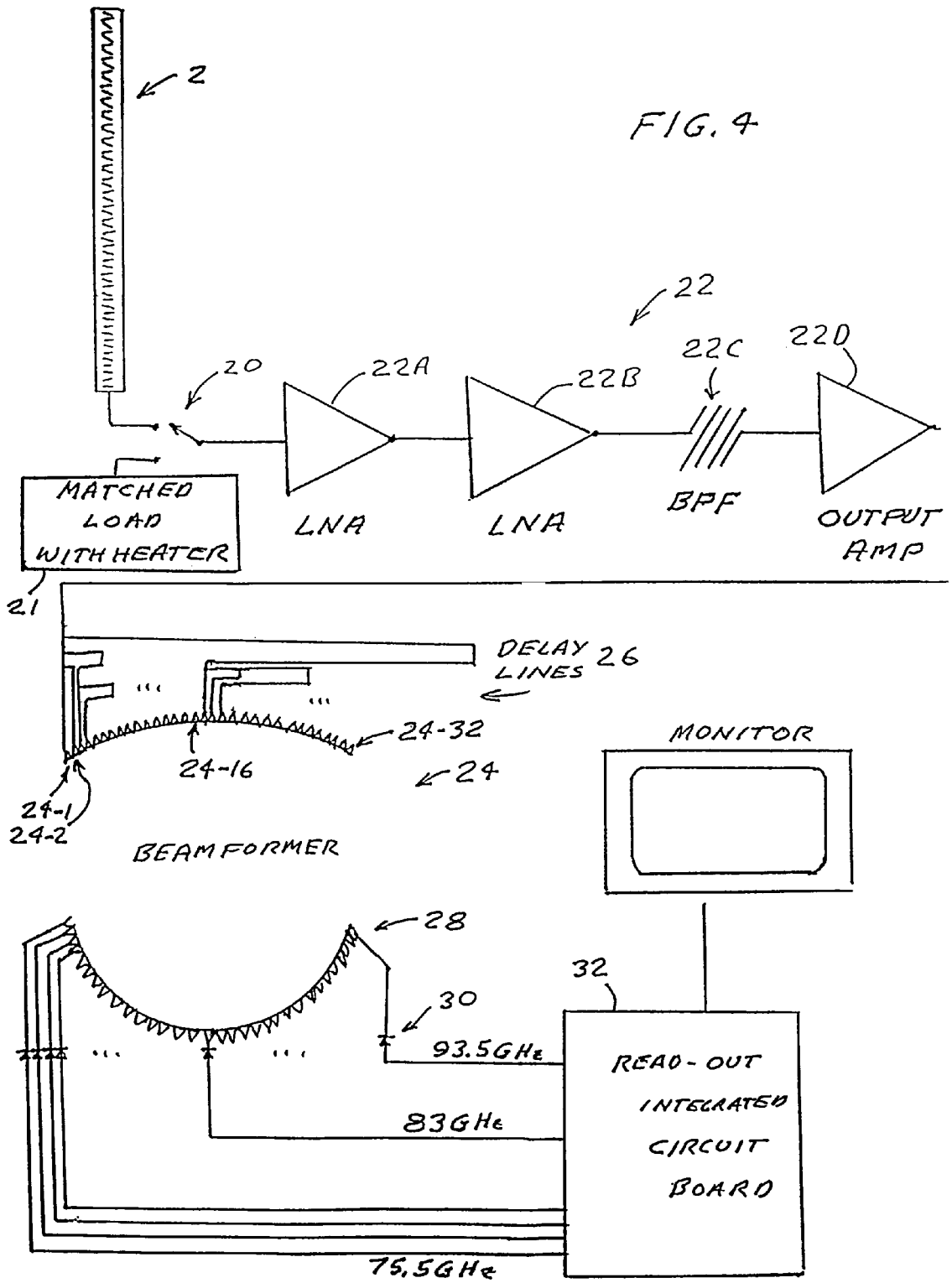

MM WAVE IMAGE OF HIDDEN PLASTIC GUN - INDOORS

MM WAVE IMAGE OF HIDDEN METAL GUN - INDOORS

MM WAVE IMAGE OF HIDDEN METAL GUN - OUTDOORS

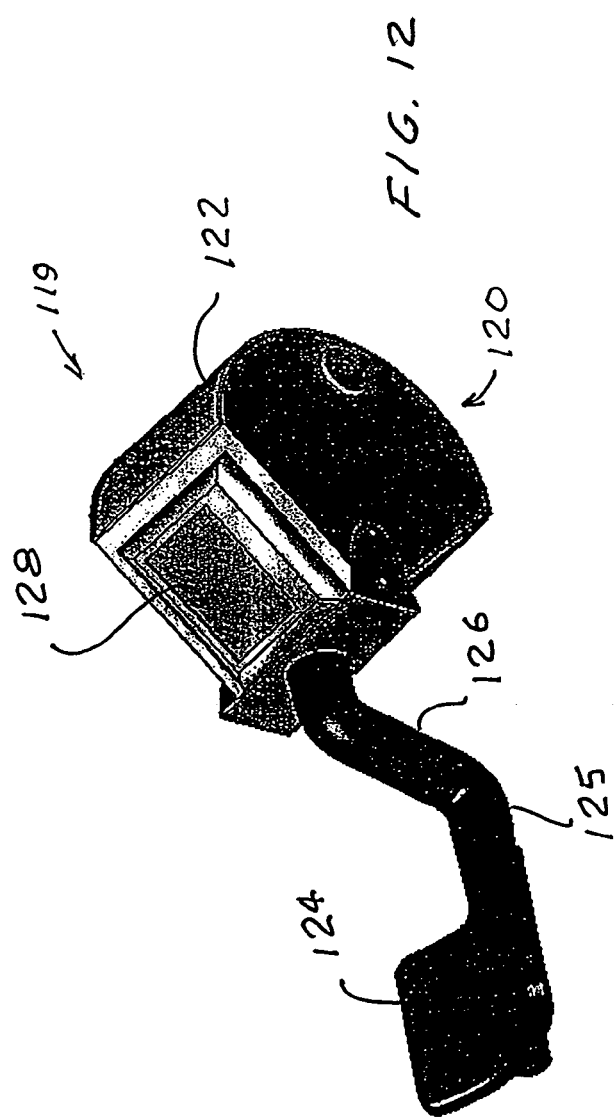
FIG. 12
FIG. 13

Generic QR System Architecture

MILLIMETER WAVE PORTAL IMAGING SYSTEM

The present invention is a continuation in part of U.S. patent application Ser. No. 10/639,322 filed Aug. 12, 2003 now U.S. Pat. No. 6,937,182, Ser. No. 10/728,432 filed Dec. 8, 2003 now U.S. Pat. No. 7,194,236 and Ser. No. 10/903,129 filed Jul. 30, 2004 now U.S. Pat. No. 7,248,204, Ser. No. 11/021,296 filed Dec. 23, 2004 now U.S. Pat. No. 7,170,442, Ser. No. 60/629,816 filed Nov. 19, 2004 and claims the benefit of Ser. No. 60/635,751 filed Dec. 14, 2004 and Ser. No. 60/646,015 filed Jan. 22, 2005, each of which is incorporated by reference herein. The present invention relates to inspection systems and in particular to portal-type inspection systems.

BACKGROUND OF THE INVENTION

Since the terrorist attack on the United States on Sep. 11, 2001, security issues have received greatly increased attention in the United States and elsewhere. Searches of personnel for weapons and explosives are routine for air travel and for access to many other events and facilities. Portal systems are regularly used to detect weapons and explosives. Operators with these systems preferably should be able to complete a scan in a few seconds. The most common prior art systems are metal detectors for personnel screening and x-ray systems for examining luggage.

Metal Detectors

Metal detectors are very well known and are used extensively in security applications. An important use is in walk-through portal security devices for the detection of concealed weapons and contraband. Such portal devices are currently used at most airports for passenger screening. Metal detectors are generally subdivided into passive and active types. The passive types are designed to detect ferrous materials and are not sensitive to other metals. Active systems excite eddy currents in conductive materials and measure their magnetic response. Due to low conductivity of most ferrous materials the active systems are less effective in detecting ferrous metals. In advanced security portals individual sensors are responsible for detection of objects located at various height levels (screening sectors). The operation of an active type metal detector is explained by reference to FIG. 17. A time varying magnetic field 110 from source coil 112 produces eddy currents in conductive object 114 that in turn produce magnetic fields 116 that produce currents in detector coil 118 that indicates the presence of conductive object 114.

Because current metal detectors only detect metallic contraband items and do not image them, they do not detect all threatening contraband, and generate high false positive rates that require expensive manual searches (due to the manpower required). They are minimally invasive and enable high throughput with a reasonable footprint. Although they do not require significant capital to purchase and deploy, but their effective cost of operation is high because they are not effective security screening devices without adjunct manual post-screening wand and frisk detection.

X-Ray Systems

X-ray systems are the principal detectors used for luggage detection. Because they emit ionizing radiation, however, they are not often mentioned as a solution for personnel screening. Some development has occurred with backscatter x-ray systems that rely on received scatter on the side (or sides in the case of a two-sided version) of the entering x-ray beam. A handheld backscatter system, however, would be impractical.

Nuclear Quadrupole Resonance

Nuclear quadrupole resonance (NQR) is a form of spectroscopy relating to nuclear magnetic resonance (NMR) spectroscopy. Unlike NMR, it does not rely on the presence of a strong magnetic field. Instead, it relies on nuclear spin states of some nuclei in which the positive electric charge carried by these nuclei is not distributed with perfect symmetry. In effect, the nucleus is stretched along one axis. The nuclear spin states are determined by the electrostatic interaction of nuclear charge density and the external electric potential of surrounding electron cloud. Because it relies on an inherent feature of the molecule of interest, it is inherently chemospecific to many explosives. The nucleus of nitrogen (the common element in explosives) is not spherical and the frequencies of the NQR signals enable the distinction of explosives from innocuous materials. As indicated in FIGS. 20A and 20B, NQR instruments work by applying a short pulse radio frequency (rf) magnetic field near the NQR frequency of the target molecules. The antenna then receives a return signal. If the molecules of interest are present, the instrument will sense the return signal at its specific frequency. NQR analysis has many inherent physical limitations. First, the strong outgoing pulse causes a reverberation that can interfere with the receipt of the return signal (the so-called relaxation time problem). If the return signal only lasts a short time, the return signal cannot be received. TNT, for example, has a delay time of less than one millisecond. In addition, encasing the explosive in a metal container will prevent the RF signal from reaching the explosive target to enable the generation of the return signal. In addition, NQR is not sensitive to liquid explosives or small amounts of explosives. There have been many attempts to overcome these limitations. For example, special circuitry has been employed to dissipate energy of the outgoing pulse. In addition, techniques have been developed to create spin echoes—in effect, mesurable return after the signal "dies" out. U.S. Pat. No. 6,777,937, for example, identifies a two-coil array that produces a more uniform magnetic field (orthogonal fields with low mutual inductance) to increase sensitivity and separate NQR signals from piezoelectric and acoustic ringing. A two-coil system, of course, can use a subtractive technique to compensate for unwanted RF signals. Despite these improvements, experts in the field do not believe, for example, that NQR can be a primary sensor for landmine detection. Most developers of NQR systems have developed systems for detection of objects, not personnel. Some have made suggestions of a handheld detector for landmine detection and perhaps for other purposes.

Millimeter Wave Imaging Systems

Imaging systems operating at millimeter wavelengths (1 cm to 1 mm; 30 GHz to 300 GHz) are well known. These systems can be important because radiation at these wavelengths is not completely attenuated by substantial distances of fog or smoke, as is visible light. Radiation at millimeter wavelengths will also penetrate clothing and significant thickness of materials such as dry wood and wallboard.

These millimeter wave imaging systems have therefore been proposed for aircraft to improve visibility through fog and for security applications for detection of hidden weapons and the like. Such systems are described in U.S. Pat. Nos. 5,121,124 and 5,365,237 that are assigned to Applicant's employer. The systems described in those patents utilize antennas in which the direction of collected millimeter wave radiation is a function of frequency. This type of antenna is referred to as a "frequency scanned" antenna. The collected millimeter wave radiation is analyzed in a spectrum analyzer to produce a one-dimensional image. Two dimensional images may be obtained by scanning. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system that includes a frequency scanning antenna and a spectrum analyzer for converting coded radiation distributions collected by the antenna into a time coded distribution so that a one-dimensional scene can be reproduced.

Hand Held Detectors

Handheld security detection systems must resolve suspicions that arise due to screening in higher-throughput portal devices or be used as a primary screening tool in lower-throughput environments. A handheld device thus must help to distinguish innocuous from suspicious items in a cost-effective manner and at low cost.

Other Prior Art

Concealed Weapons and Contraband Imaging and Detection Systems

The United States Department of Justice, National Institute of Justice in its NIJ Guide 602-00 (NCJ 184432) has provided an excellent summary of prior art concealed weapons and contraband imaging and detection systems. This guide is available on the internet at http:/www.ojp.usdoj.gov/nij. This document describes the features, both good and not so good, of the many available systems.

What is needed is a relatively low cost, easy to operate concealed weapons and contraband imaging and detection system for use in handheld screening for weapons and contraband.

SUMMARY OF THE INVENTION

Portal System

The present invention provides a millimeter wave portal imaging system for the detection of concealed weapons, explosives and other contraband items. A preferred millimeter wave imaging system includes a number (such as 64) of millimeter wave detection units each including a frequency scanning antenna and associated electronics. The units are mounted in four posts (16 per post) of a portal structure. Each unit collects frequency dependent beams of millimeter wave radiation from a narrow one-dimensional field of view. The collected radiation from each unit is amplified at the collected frequencies and the amplified signals are separated into frequency dependent bins with a tapped-delay beam-former. These bins are then sampled to produce a one-dimensional image of the antenna field of view. A two dimensional image of a portion of a person passing through the portal is obtained by moving the person (or having the person move) across the field of view of each of the frequency scanning antennas. The images from the antennas can be monitored separately or data from the antennas can be combined with a computer processor to form images of the person.

In preferred embodiments the basic millimeter wave antenna is only 4.5 inches in length and constructed from WR-10 waveguide with inclined slots cut in one of the narrow walls at 79 mil spacing. This geometry (with the antenna positioned in a vertical direction) creates a frequency-scanned antenna spanning a 20 degree vertical field of view over a 75.5-93.5 GHz operational band of the sensor, starting at approximately 1 degree below horizontal at 93.5 GHz and ranging to approximately 21 degrees below horizontal at 75.5 GHz. A narrow, rod-shaped cylindrical lens covers the waveguide slots at each element and vertically focuses the antenna beam 19 inches from the antenna.

The antenna is aligned along one focal axis of a vertically oriented elliptical cylinder reflector, 4.5 inches across with the second, parallel focal axis of the reflector located 19 inches from the antenna as measured along the light path. This arrangement gives a one-dimensional beam. At focus (19 inches measured along the light path from the antenna) the field of view is a little less than ½ inch wide and about 6 inches high. The system has an approximate depth of focus covering 14 inches at minimum range to about 29 inches at maximum range. The frequency-scan angular range corresponds to about 4.5 vertical inches at the minimum operational range of 14 inches. The horizontal and vertical resolution (half-power beam-width) at the center-band frequency of 84.5 GHz is about 1.57 degrees, or less than ½-inch at the 19-inch focus. A scan (of either the antenna or the target) in the horizontal direction is required for a two dimensional image.

Hand Held Unit

Preferably only one unit (antenna and electronics) is used in a hand-held imager. Scanning is accomplished by wrist or arm motion. In a preferred embodiment, a 6-inch×6-inch field of view at focus is imaged with a one second scan. The hand held unit preferably also contains a built-in metal detector, preferably an active eddy current metal detector. The hybrid detector preferably also contains a built-in NQR detector (either a single coil or dual coil system). Because the radio waves emitted from the unit are so far removed from the millimeter-wave region of the electromagnetic spectrum, the NQR detector will not interfere with operation of the millimeter-wave imager. The millimeter-wave imager will identify most suspicious contraband and the NQR detector will identify most explosives that are incorporated into objects that appear innocuous with the millimeter-wave imager.

BRIEF DESCRIPTION OF THE DRAWINGS

FIGS. 2C, 2D and 2E show techniques for focusing a Cassegrain-type antenna.

FIGS. 3A and 3B show an arrangement 64 of the above antennas in a portal contraband scanner.

FIG. 4 shows electronic circuits for converting millimeter wave signals to images.

FIGS. 12 and 13 show features of a hand held imager and hand held hybrid imager-detector.

DETAILED DESCRIPTION OF PREFERRED EMBODIMENTS

4.5-Inch Millimeter Wave Imager

First Antenna Element

Figures 1A, 1B, 1C:
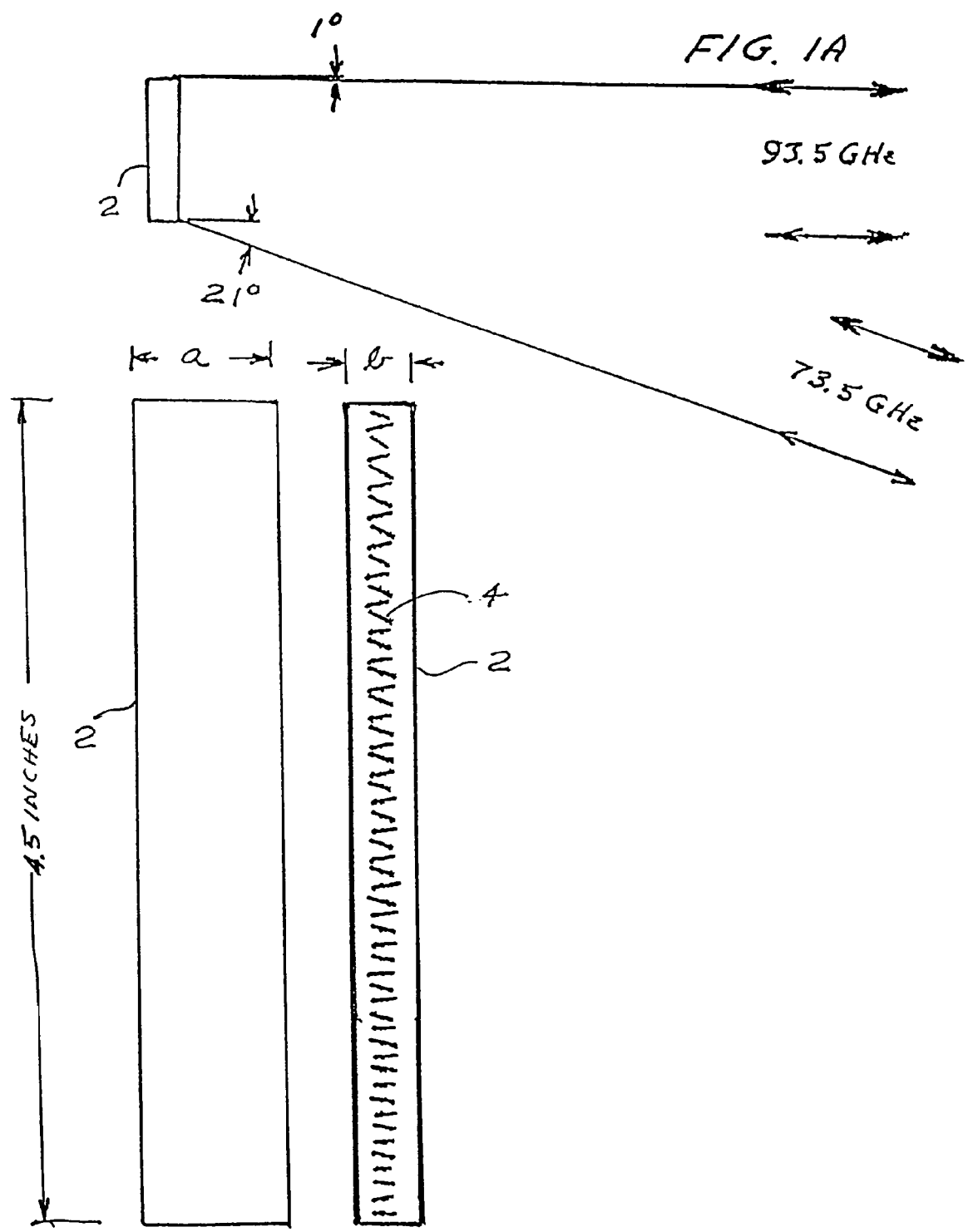
FIGS. 1A-1C show features of a one-dimensional frequency scanning slot antenna.

FIGS. 1A, 1B and 1C are drawings showing features of a one-dimensional millimeter wave antenna according to aspects of the present invention. FIG. 1A shows the elevation field of view of the basic antenna element 2. Each antenna element 2 is constructed of WR-10 waveguide and has exterior dimensions a=0.180", b=0.130" and interior dimensions a=0.100", b=0.050". The antenna element is approximately 4.5 inches long. In the fabrication of the antenna, one of the narrow walls is thinned from 40 mils to 6 mils. Then, each WR-10 waveguide antenna has 57 inclined slots 4 cut into its narrow wall at a spacing of 0.079", which serve as emitting elements. The angle of the slots, and thus the coupling coefficient, increases from 9.66 degrees on the feed end to over 25 degrees at the load end to provide nearly constant field strength along the antenna length. The direction of the angle alternates, providing a "pi" radian phase shift between successive coupling slots. This geometry creates, for a vertically mounted antenna, a frequency scan spanning a 20-degree vertical field of view (over a 75.5 to 93.5 GHz operational band of the sensor) starting at 1 degree below horizontal at 93.5 GHz and ranging to approximately 21 degrees below horizontal.

Second Antenna Element (Modified Cassegrain)

A second preferred antenna 50A based on a modified Cassegrain design is shown in FIGS. 2C, 2D and 2E. A target located at a focal line 3A emits MMW energy. Some of this MMW energy is captured by a primary reflector 8A. The primary reflector is elliptical along the horizontal axis and planar along the vertical axis. It refocuses the energy in the horizontal plane to a virtual point located behind a secondary reflector 9A. The secondary reflector is a complex surface which is concave along the vertical axis but convex along the horizontal axis. The concave surface follows a parabolic curve and energy from any point in the focal plane (1) is reflected as parallel rays along the vertical axis. The convex surface follows an elliptical curve and the reflector maps the virtual focal point of the primary reflector 8A to an antenna 2A located directly behind the primary reflector. The reflector system in the horizontal plane is a traditional Cassegrain reflector set-up with the antenna feed accessed through a slot cut in the middle of the primary reflector 8A. The energy emitted from the focal point is then refocused to this antenna. The antenna 50A is a frequency scanned traveling wave antenna formed on a circuit board. The coupling angle varies with frequency from 1 to 21 degrees off-axis as the frequency varies from 93.5 GHz to 75.5 GHz. The entire secondary reflector 9A is oriented off-axis at an angle of 11 degrees to the antenna in the vertical plane as shown at 7A in FIG. 2E, changing the collection angle of the reflector system to +/−10 degrees relative to normal to the primary reflector and antenna. The elliptical horizontal cross-section of the secondary reflector is varied along its vertical length to compensate for its varying distance from the primary reflector.

Focusing the Antenna Elements

Figure 2A:
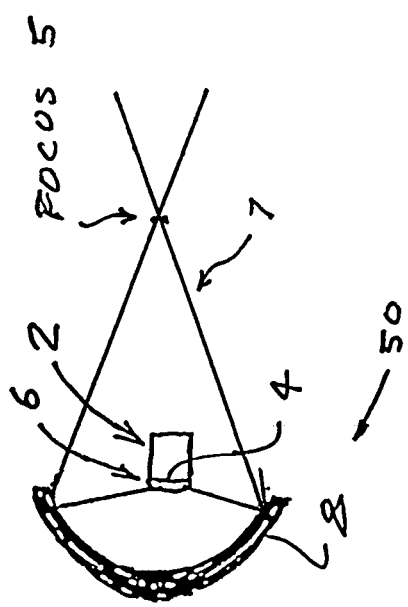
FIGS. 2A and 2B show techniques for focusing the antenna shown in FIGS. 1A-C.
Figure 2B:
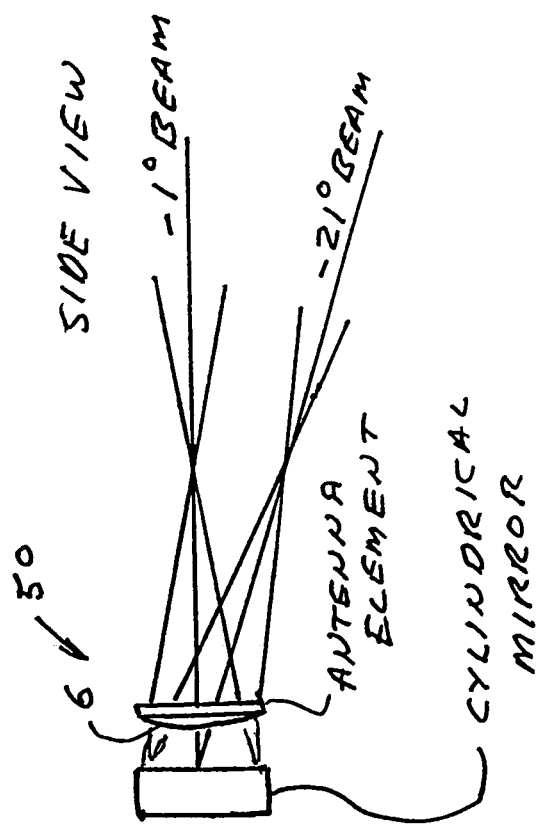

In preferred embodiments the antenna element 2 shown in FIGS. 1A, 1B and 1C is focused to 19 inches as shown in FIGS. 2A and 2B. In this case a vertically oriented elliptical cylindrical mirror 8, 4.5 inches across has one of its focal lines at the center of slots 4 of antenna element 2 that is positioned 3.5 inches from mirror 8 and its second focus 5 at 15.5 inches from mirror 8 and 19 inches from the antenna 2 as measured along the light path from focus position 5 to antenna 2 all as shown in FIG. 2A. Also a narrow rod-shaped collimating lens 6 covers waveguide slots 4 and vertically focuses the antenna beam 7 at 19 inches from the antenna as measured along the light path. At the frequency range of 93.5 to 73.5 GHz the wavelengths of the collected radiation are about 0.14 inch (3.6 mm), corresponding to the mid-band frequency, 83.5 GHz. However, in this preferred embodiment the resolution element (as described in more detail below) is somewhat larger (in the range of about 0.5 inch) in both the horizontal and vertical directions. Antenna element 2 along with its focusing elements is designated as antenna element 50 in FIGS. 2A, 2B, 3A and 3B. At the focus, the field of view of the system is a little less than ½ inch wide and about 6 inches high. This produces a one-dimensional image since there is no resolution in the horizontal direction. A two-dimensional image is produced by scanning the antenna or the target.

Antenna Electronics

Calibration and Amplification

In this preferred embodiment Dicke switching is used for calibration of the imaging system. This technique utilizes, as shown in FIG. 4 a front-end switch 20 that alternates between looking at the antenna signal and looking at a set temperature load 21. The front-end switch 20 switches at a rate of 3.84 kHz between the antenna and a load termination. The load can be heated by approximately 40K for one switching cycle. This allows the unit to perform a two-temperature calibration in real time, compensating for gain fluctuations in the amplifiers as well as temperature offsets. The switch itself is a W-band microwave monolithic integrated circuit (MMIC) PIN switch fabricated by M/A-Com with a transmission loss of about 1.8 dB.

The front-end switch is packaged with, and feeds directly into, a front-end amplifier unit 22. This front-end amplifier unit consists of two low noise MMIC amplifiers 22A and 22B, band pass filter 22C and low noise MMIC output amplifier 22D. The amplifiers are required to have a wide bandwidth but maintain a low noise figure, as they set the noise temperature for the entire system. They operate over an 18 GHz bandwidth, from 75.5 GHz to 93.5 GHz. The first two amplifiers in the chain 22A and 22B have a noise figure of approximately 4 dB over the 18 GHz band and a gain of about 19 dB. Band pass filter 22C separates these amplifiers from the third amplifier 22D that is of a slightly different design. The third amplifier 22D, the output amplifier, is tuned for a gain of about 22 dB and is capable of generating output power of up to 1 mW before compressing. Once packaged, the entire gain stage has approximately 53 dB of gain and a noise output power of −11 dBm, with a noise figure averaging 7 dB. This includes losses from the filter and the transitions. Thus, each amplifier channel 22 provides 53 dB of gain, as well as an integrated matched load with a heater, and PIN switch for in-situ two-temperature flat field calibration. The MMIC amplifiers and the band pass filter are preferably fabricated using a co-planar waveguide design on an indium phosphide substrate.

Tapped Delay Beamformer

This broadband amplified antenna power is fed into a tapped-delay beamformer as shown in FIG. 4 for decomposition into frequency bins representing a vertical frequency image of the antenna field of view. Delay lines 26 transmit the amplified antenna signal into 32 signal ports of beamformer 24. Beginning at port 24-1 at the left side of beamformer 24, the signal to each port is delayed by 36 ps (relative to its left side neighbor port). The 36 ps delay is equivalent to three wavelengths at centerband of 83.5 GHz. (The millimeter wave frequency of 83 GHz wave in air corresponds to a wavelength of about 3.6 mm, and light travels that far in about 12 ps.) Thus, a signal arriving at port 24-1 at time 0 would also arrive at port 24-2 at time 36 ps, would arrive at port 24-16 at time 576 ps and would arrive at port 24-32 at 1.152 ns. The series of 32 taps samples a total time interval of 1.152 nanoseconds, yielding a frequency resolution of 870 MHz for the beam-former. (The frequency resolution for these beam-formers is the inverse of the total time spread; so in this case 1/1.152 ns=870 MHz.) The beam-former sorts the 18,000 MHz broadband signal from the antenna into 32 frequency bins represented by 32 output ports 28. This provides an average separation between frequency bins of 580 MHz, thus over sampling the vertical focal plane by about 2.4× relative to the 1408 MHz bandwidth of each antenna beam. (The frequency separation is 18,000 MHz/31=580 MHz, and the beam-width of the antenna beams is approximately equal to the inverse of the time [about 0.71 ns] for light to traverse the antenna element [1/0.71 ns=1.408 MHz].) Losses in the delay line, the beam forming lens, and input transition, as well as bandwidth splitting losses drop the power level at each lens output to about −36 dBm. A set of 32 sensitive detector diodes 30 integrates this power in the 32 frequency bins for each channel to provide a voltage signal corresponding to the intensity of the millimeter wave light collected by the antenna element at each of the 32 frequency ranges. The voltage signal from each of these diode signals is then read out by multiplexing readout integrated circuit chips on readout integrated circuit board 32.

The beam-former is implemented in a low loss dielectric, such as polypropylene, with smooth copper cladding. The delay lines 26 are created at very low cost with a lithographic etching that creates the circuit pattern, which is then sandwiched between two ground planes in a heated press. In preferred embodiments, the smoothness of the copper making up the inside surface of the delay lines is extremely important. Applicants have discovered that they could reduce the losses in these lines from 1.2 dB/inch to about 0.5 dB/inch by requiring that the copper surface roughness not exceed 300 nanometers. Prior art microwave surface roughness specifications were 1400 to 2900 nanometers. As explained above, the signals from these 32 taps are launched into beam forming lens 24, which steers each signal frequency range into one of 32 output ports 28.

Portal Contraband Screener

In a preferred embodiment of the present invention shown in FIGS. 3A and 3B, 64 antenna elements of the type discussed above are utilized to provide a portal contraband screener. In this preferred embodiment four sets of 16 vertically stacked antenna elements 50 are arranged to monitor persons passing through a portal preferably on a horizontal escalator at a known velocity of about 1.5 feet per second. Each antenna element is 4.5 inches long (with a 0.5 inch spacing between elements) so the stacks are 80 inches high with two of the stacks 10A and 10B arranged to view the person's front and side and two of the stacks 10 C and 10 D arranged to view the person's side and rear all as shown in FIGS. 3A and 3B.

As a person 51 approaches the portal, which is about 41 inches wide; he/she enters the area of focus at a distance equal to roughly half the portal width (20.5 inches) from the portal centerline. At this range the forward-looking imaging antennas in stacks 10A and 10B are focused on the subject's front midline. As the person moves closer to the portal, the sensor foci sweep outward from the midline as indicated at 52 to generate a full 2-D image of the front and sides of the person. At the nominal travel speed of 1.5 feet per second, the antenna beam moves through one resolution element approximately every 40 milliseconds. The imager reads out at 30 Hz, slightly over sampling the horizontal plane. In one second, as the person moves forward by 18 inches, the two antennas combine to record 60 columns of image pixels surrounding the front and two sides of the subject, separated horizontally by less than a quarter-inch projection. As the person leaves the portal, a second pair of antennas in stacks 10C and 10D images his/her back and sides in the same manner.

Electronic Features of the Contraband Screener

In this embodiment, the 16 antenna elements making up each antenna column feed 16 receiver channels with an amplifier set and beam-former for each antenna. The amplified signals from the antenna elements are processed as a pair of images, one representing the front and sides of the person and the other representing the sides and rear of the person passing through the portal. In this preferred embodiment the sensors operate at a 30 Hz rate, producing 30 images per second. If we set the passage so that the image time for both front and rear images take one second each, both front and rear images will each contain 60 pixels in the horizontal direction. For the vertical direction, each of the 16 antenna elements in each column produces 32 angular beams for a total of 512 angular beams. These beams will be equally spaced in the vertical direction over 80 inches only at about 7 inches from the antenna stacks and will overlap beyond about 7 inches. Thus, both the front and rear images will each contain about 60 pixels across and 512 pixels high, and the images will produce a wraparound view of the person traversing the portal.

The pixel size is about 0.5 inch in the horizontal direction and about 0.16 inch in the vertical direction at a range of 7 inches from the stacks. For those portions of the person located substantially farther from the antenna stacks than 7 inches, the pixel data could be modified with computer software to accommodate the overlap to produce continuous stitched wrap-around images.

Each of the 16 amplifiers in each column holds a switch and up to four cascaded gain stages with WR-9 inputs. Each amplifier includes connections for power and control signals and adequate shielding to prevent feedback in the gain stage.

Background and Illumination

When a person is not passing through the portal, the antenna arrays have nothing within their focal area and instead receive signal from a broad area beyond the focal region. A post can be erected in this area can be coated with millimeter absorptive foam at ambient temperature. The foam acts as a blackbody at millimeter wave frequencies, emitting a fixed, broadband signal to the antennas. If the foam temperature is less than the temperature of a human body, the foam provides a good contrast to a person passing through the detector. Thus, in preferred embodiments the posts are cooled to a temperature much lower than ambient such as the temperature of melting ice. (In other situations it may be desirable to have a hot object placed in the field of view of the antennas for calibrating the system.) A cold background improves the clarity and sharpness of the generated images. Also, in preferred embodiments contour contrast can be added to the images of the persons being screened by providing a cold surface above the portal that would be a source of low temperature thermal radiation. Therefore, millimeter radiation in the band detected by the antenna elements that is reflected off the person after being emitted from the cold source will be very small compared to reflected radiation from other surrounding warmer sources. As a result the scanner will see substantial contrasts on the persons scanned depending on the angular orientation of various portions of his body, his clothing and potential contraband. Also, lacing the portal outdoors so that most reflections from the persons passing through the portal are reflections for the cold sky can greatly improve contrasts.

Figure 10:
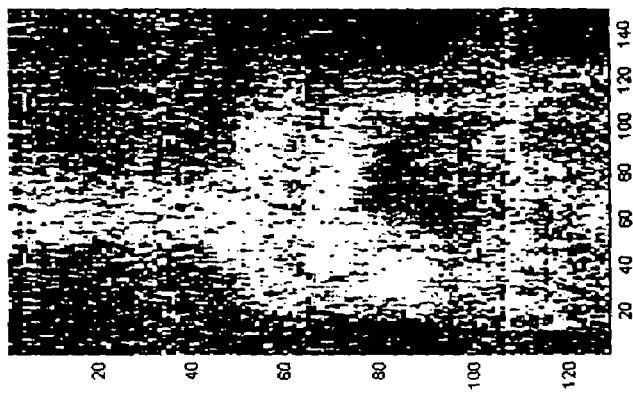
FIGS. 8, 9 and 10 show image created by a portion of a prototype unit.
Figure 9:
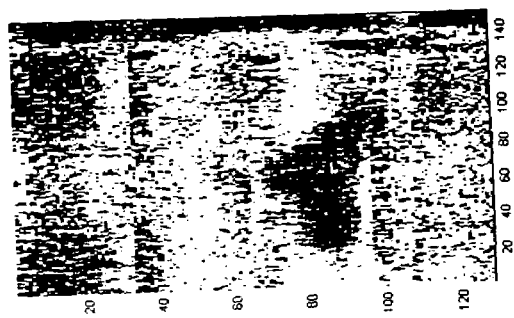
Figure 8:
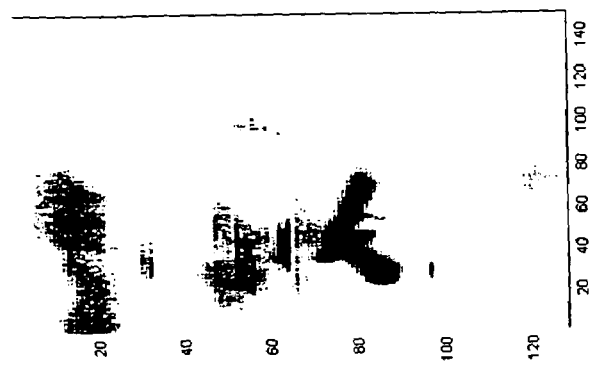
Figure 11:
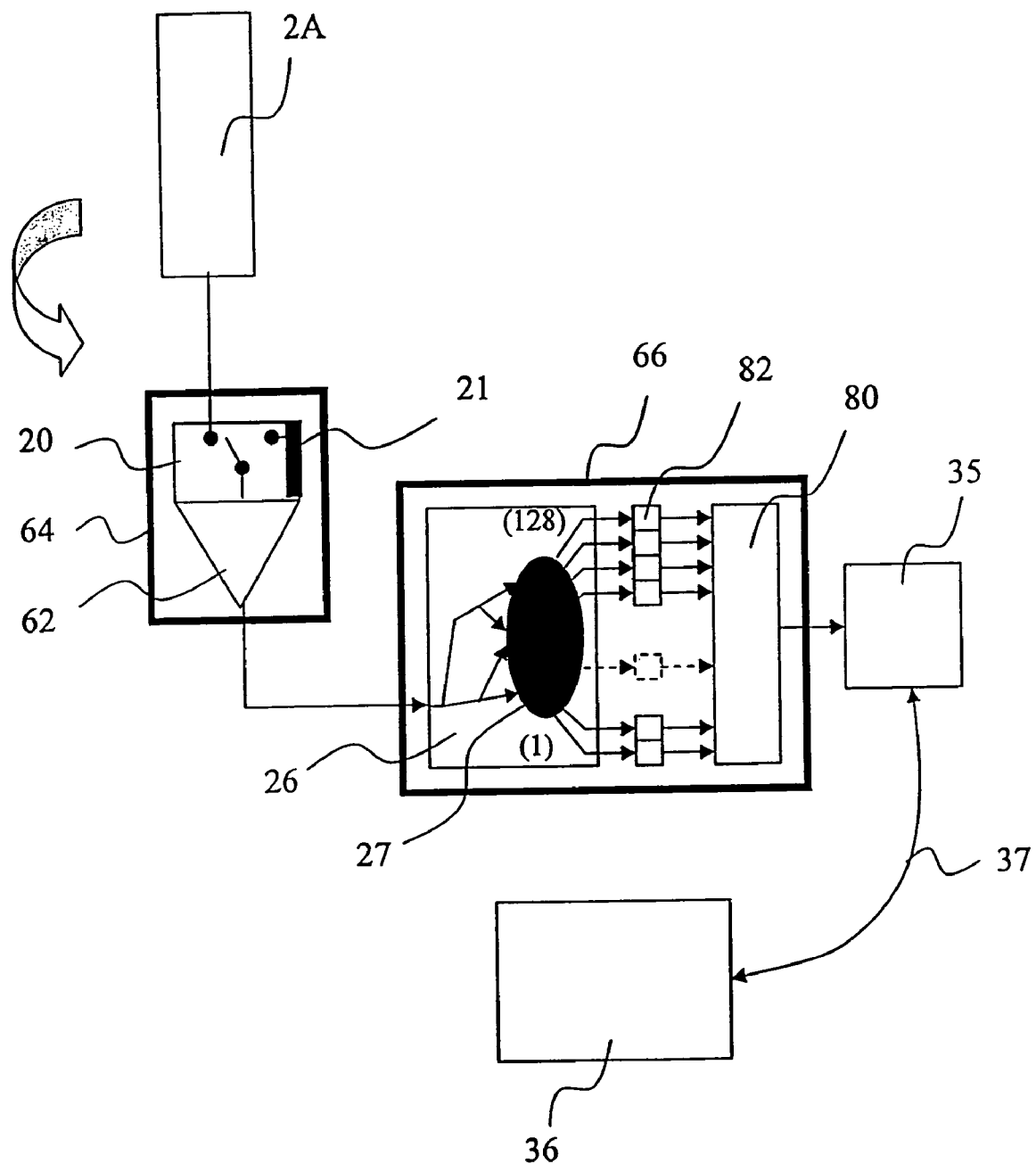
FIG. 11 is a block diagram describing the major elements of the second preferred embodiment.
Figure 14:
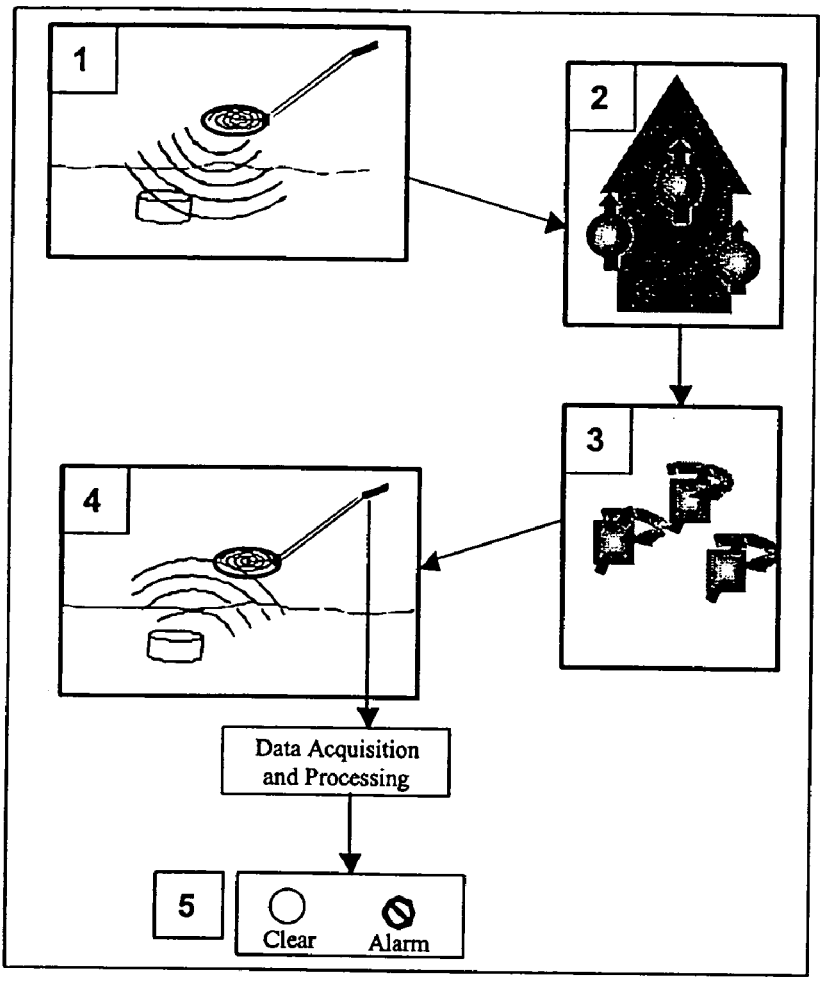
FIGS. 14 and 15 show features of a nuclear quadrupole resonance detection system.
Figure 15:
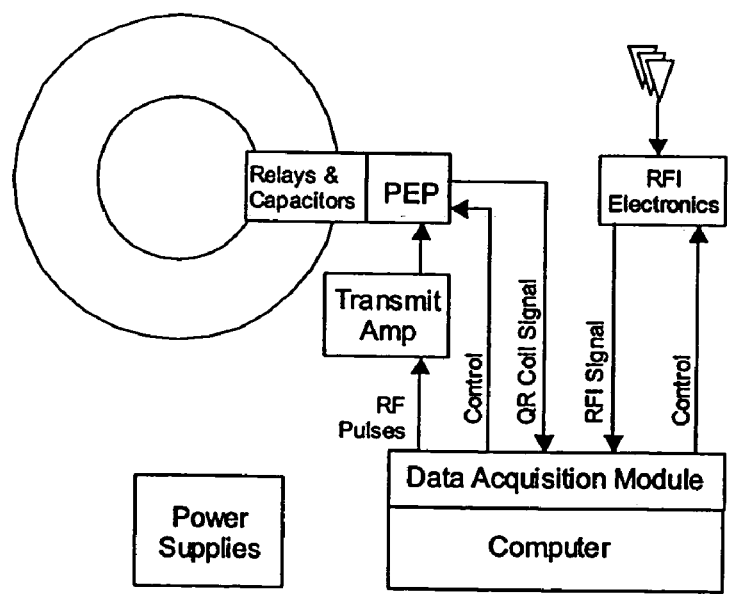

Images of four antenna units of a prototype portal unit under construction by Applicants are shown in FIGS. 8, 9 and 10. Each of the images were made of a gun placed on the mid section of a persons body as he passed (during a period of about three seconds) in front of the four units. FIG. 8 is an image of a metal gun taken outdoors. FIG. 9 is an image of the same metal gun taken indoors and FIG. 10 is an image of a non-metal gun taken indoors.

Privacy Issues

A preferred application of the present invention as described above includes the visual examination beneath the clothing of people in search of weapons or other contraband. An example would be at an inspection portal at airports. This requires the examination of many innocent people. The images obtained show features of the peoples' warm skin. Body parts normally covered with clothing are imaged with resolutions of about 0.5 inch. Therefore, privacy issues must be recognized and dealt with. In a preferred application of the portal contraband screener, two separate screeners are provided, one marked "women," and one marked "men." Inspection personnel for the women screener are female and inspection personnel for the men screener are male. The monitors showing images of the people being inspected are protected from public view and images that are saved for evidentiary purposes are carefully controlled by inspection personnel. Any person would have the right to not be screened by the contraband screeners but persons exercising that right would be subject to an appropriate manual search.

In another preferred embodiment, computer software would be provided to blur the images at the location of sensitive body parts. In another preferred embodiment, sophisticated software is provided which provides recognition of specific contraband such as guns, knives, and bombs. An alarm signal (audible and/or visual) could then be provided if there is an indication of such contraband on the body of a subject so that the person could be selected for a more specific search. The software could also locate the suspected contraband by placing an appropriate logo on the subject's image at the position of the contraband. Alternatively, of the 64 image segments recorded only those showing skin contact anomalies are displayed.

Portal with Metal Detector and Millimeter Wave Imager

By combining a mm-wave imaging system and a magnetic metal detector into one portal an improved overall detection capability and object classification can be accomplished. In a preferred embodiment of the hybrid portal the proposed millimeter-wave imager will operate in parallel with a commercial metal detector portal such as model SMD 600 developed by CEIA Corporation or similar.

The millimeter-wave imager and metal detector working in a tandem complement each other and bring the entire system performance to a higher level. The metal detector can be extremely sensitive to very small amounts of metals which cause problems due to high frequency of alarms set by benign objects such as coins, glasses, keys etc. In order to determine the cause of the alarm security personnel have to perform manual searches, which considerably slow the screening process and increase security costs. The millimeter-wave imager may not be as sensitive as metal detectors but it has an advantage of producing images, such that objects can be visually differentiated into either threat or no threat categories.

In a contemplated scenario where the two systems are used in the same portal the metal objects that set off a metal detector alarm are then scrutinized using millimeter-wave images within the sector or sectors that have shown the presence of such objects. The size and shape of the detected object will be used to determine if further search is required. The millimeter-wave imager has a capability to detect nonmetal objects such as plastics, ceramics etc. that cannot be detected with metal detectors. Plastic and ceramic knives can be a significant threat and pose a great challenge to existing security systems which are largely based on the metal detection approach.

Figure 16A:
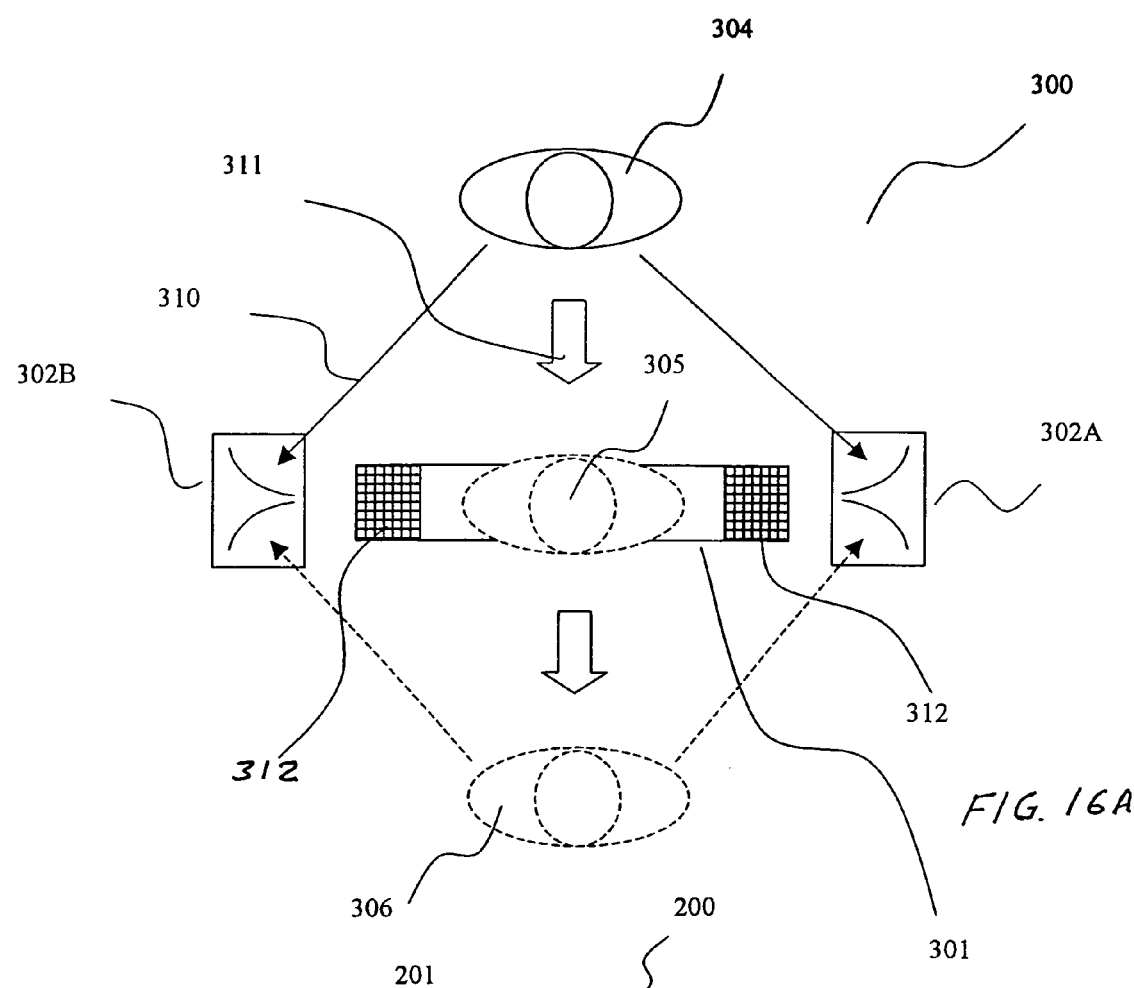
FIGS. 16A and 16B show features of a hybrid security system.
Figure 16B:
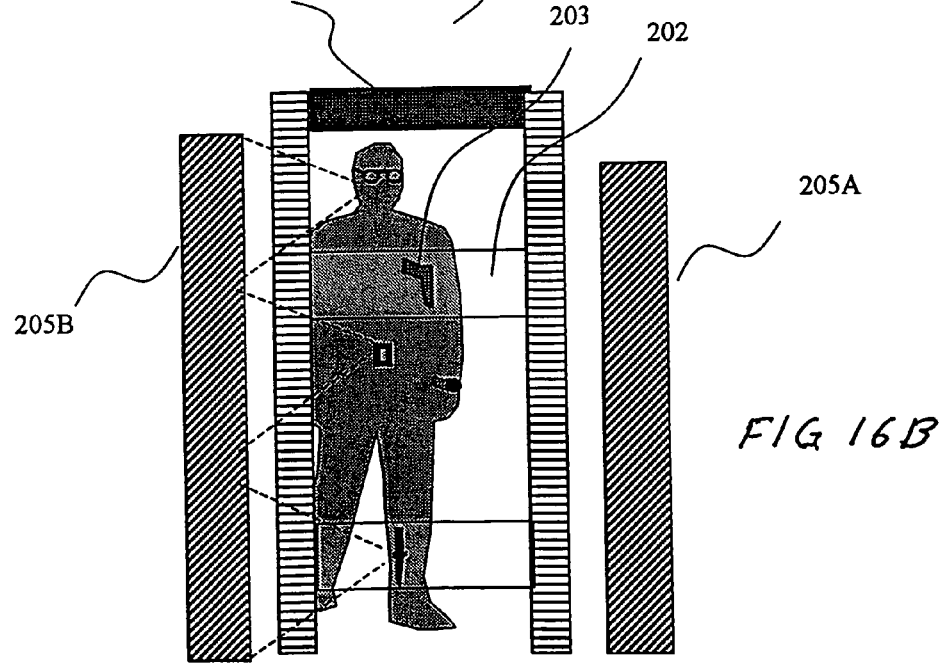
Figure 17:
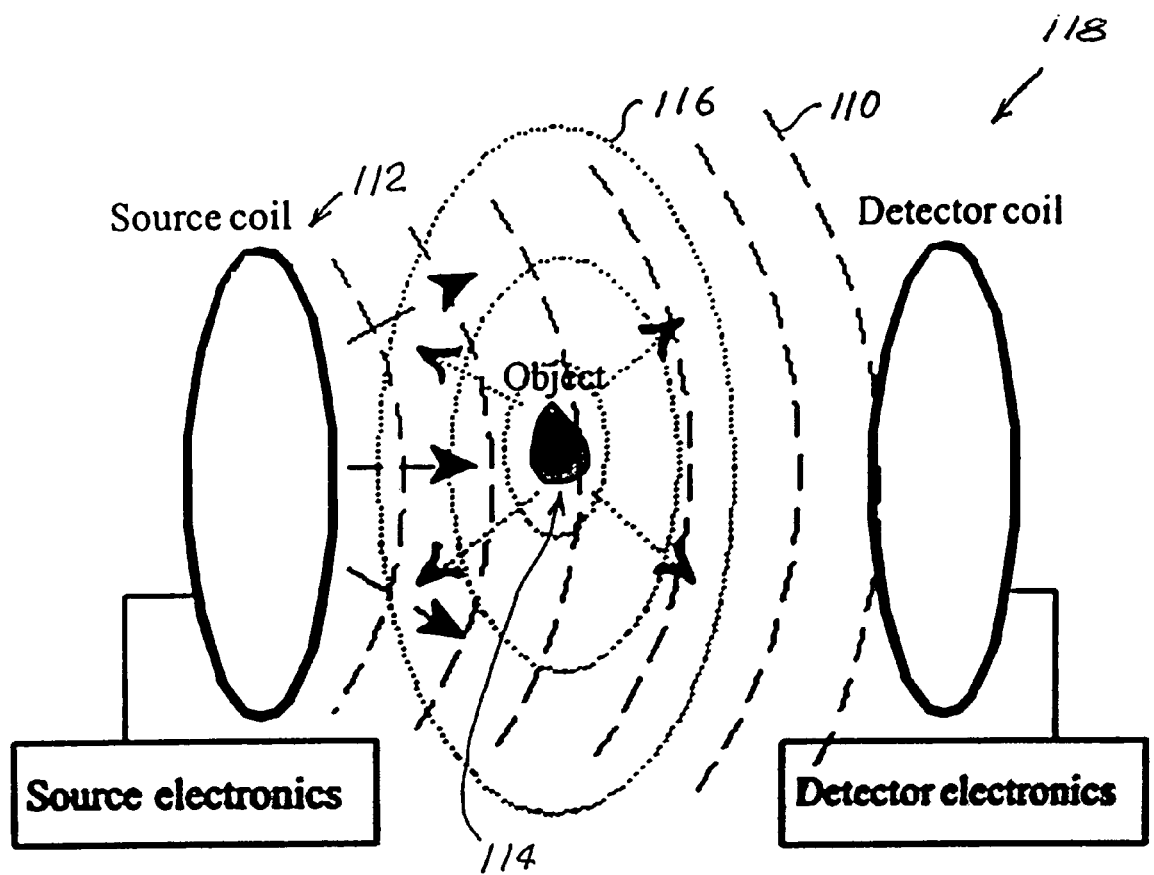
FIG. 17 show features of prior art prior art active metal detectors.

A preferred embodiment of the mm-wave and metal detector security portal 200 is shown in FIGS. 16A and 16B. Metal detector portal 201 has vertical sectors 202 with individual metal sensors. Once a metal object such as 203 is detected the portal sends an alarm signal in the form of warning lights (and/or an audible alarm) to security personnel. At the same time two millimeter-wave imagers collect thermal radiation data from the subject on the right side (205A) and two more millimeter-wave imagers collect data from left side (205B) of the portal. The metal detector warning lights (or similar indicators) in certain sectors are displayed along with the thermal images from the corresponding sectors. A decision is then made either by a human operator or automatically by a computer program, whether additional screening is required. If the metal detector does not detect metals, the thermal images may still reveal the presence of suspicious objects which would give the portal security operators a signal to perform a more detailed search.

An important advantage of the millimeter-wave imager is that in some cases it can help resolve an alarm situation without manual search. Even if additional screening is required it can help to perform it non-invasively by requiring a subject to pass through the portal one more time and by taking more mm-wave images that may clarify the nature of suspicious objects. Even though a few extra passes take some time they will be less time consuming and will not require specially assigned security personnel to perform the work.

FIG. 16A shows the top view of the preferred embodiment of the hybrid portal 300. It includes a metal detector portal 301 and millimeter-wave imaging portal 302A and 302B. The millimeter-wave portal consists of the left (302B) and right (302A) millimeter-wave imaging sensors that collect millimeter-wave radiation 310 from two opposite sides of the human subject. Subject 304 enters the portal system in the direction 311 and his frontal (left and right) surfaces are imaged by the sensors 302A and 302B. Then subject passes through the center 305 of the portal and the metal detectors 312 at different height levels sense the presence of metallic objects. At the exit from the portal 306 the rear surface millimeter-wave images of the subjects are taken by the mm-wave sensors 302A and 302B. This completes a screening cycle. If alarms are set off, a second screening can resolve the situation without manual search.

Millimeter Wave Portal Combined with Nuclear Quadrupole Resonance

Some explosives may be difficult to detect with the millimeter wave imaging equipment described above. For that reason preferred embodiments of the present invention also include a nuclear quadrupole resonance unit of the type described in the background section of this specification.

Hand Held Imager-Detector

FIG. 12 is a drawing of a hand held millimeter wave image sensor 119. The sensor is the basic imager sensor described above (see FIGS. 2A and 2B) with the antenna focused at 19 inches along the light path (15.5 inches from the back side of mirror 8) to produce a one dimensional image of a 6-inch×½-inch field of view located at the focus. (Note, however, that for this unit the antenna is positioned horizontally so that a one dimensional horizontal image is produced by a stationary unit and a vertical scan produces the two-dimensional image.) In preferred embodiments the frame rate of the sensor is 30 Hz, so a two dimensional image of a 6-inch×6-inch field of view is produced by a one-second scan produced by arm motion of the operator. Scanning significantly faster than 6 inches per second produces some blurring. Scanning significantly more slowly produces better contrast but the images will be somewhat distorted. The sensor is contained in housing 120 with cover 122 that is transparent to millimeter waves. For best results the front of the sensor is held at about 12 inches from the surface being scanned. The unit weighs about 4 pounds so an ergonomic handle is provided with an arm support 124. The handle 125 is grasped at location 126. Images of target regions are displayed on screen 128. Batteries for the unit are contained in handle 125.

In preferred embodiments metal detections coils 128 are included in the unit as shown in FIG. 13 and produce fluctuating magnetic fields to produce eddy currents in conducting objects producing other magnetic fields. These eddy current produced magnetic fields are in turn picked up by the same coils producing currents that indicate the presence of the conducting objects. For metal detection the unit is scanned as close as feasible of the surface being scanned.

OTHER EMBODIMENTS

Persons skilled in the art of contraband detection will recognize that many modifications can be made to the examples presented above.

Transport through Portal

Figure 6:
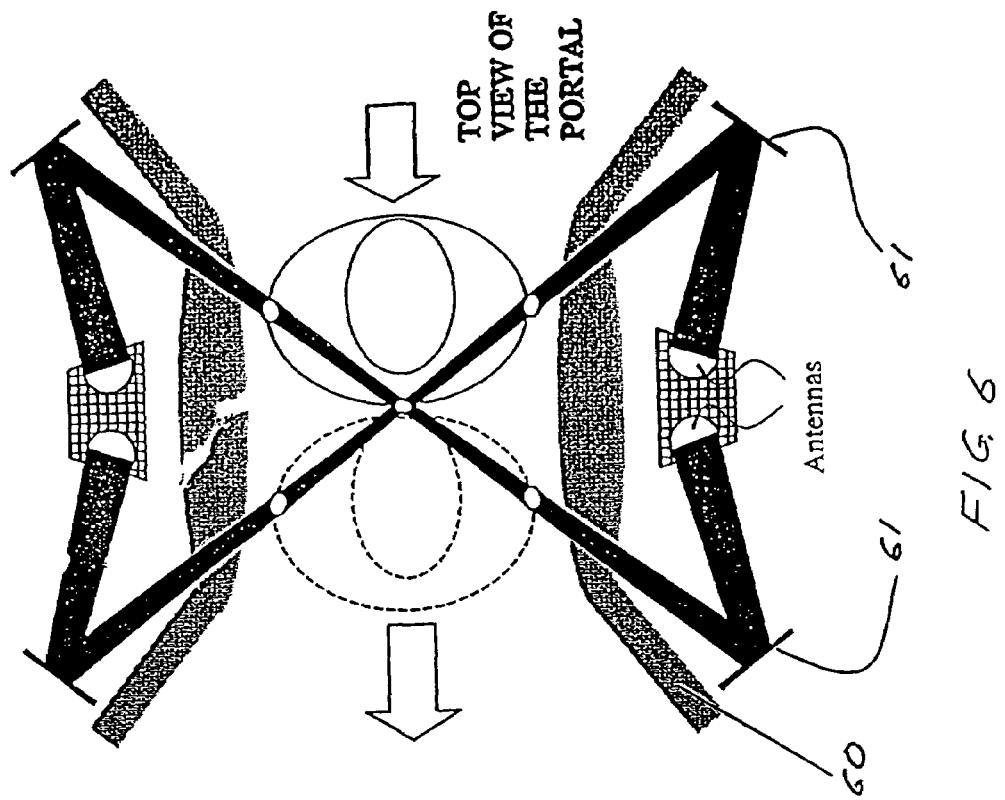
FIG. 6 shows an embodiment with a large depth of field.
Figure 5:
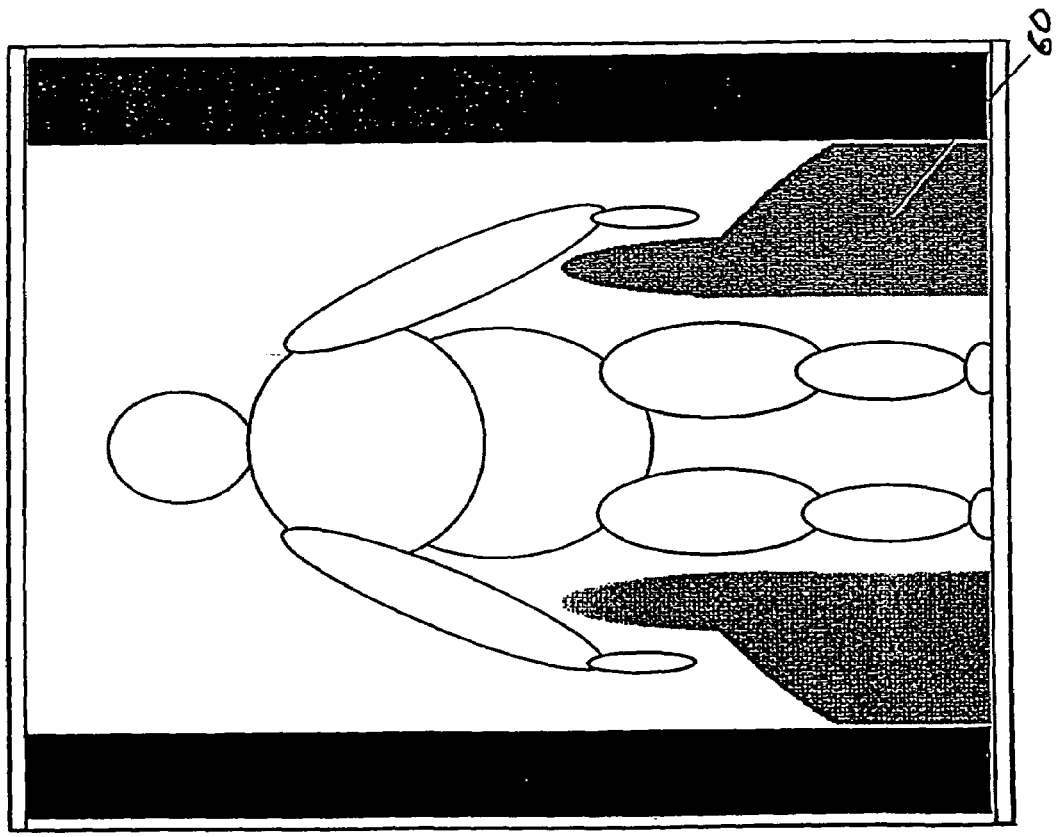
FIG. 5 shows a person passing through a screening portal.

For example, instead of having the person pass through the portal on a horizontal escalator as described above, the person could be required to walk through the portal at a designated pace such as about ¼ the normal walking speed. A millimeter wave transparent barrier 60 can be placed in the portal as shown in FIGS. 5 and 6 in order to assure the proper positioning of the persons relative to the antenna elements.

Focal Position

Figure 7A:
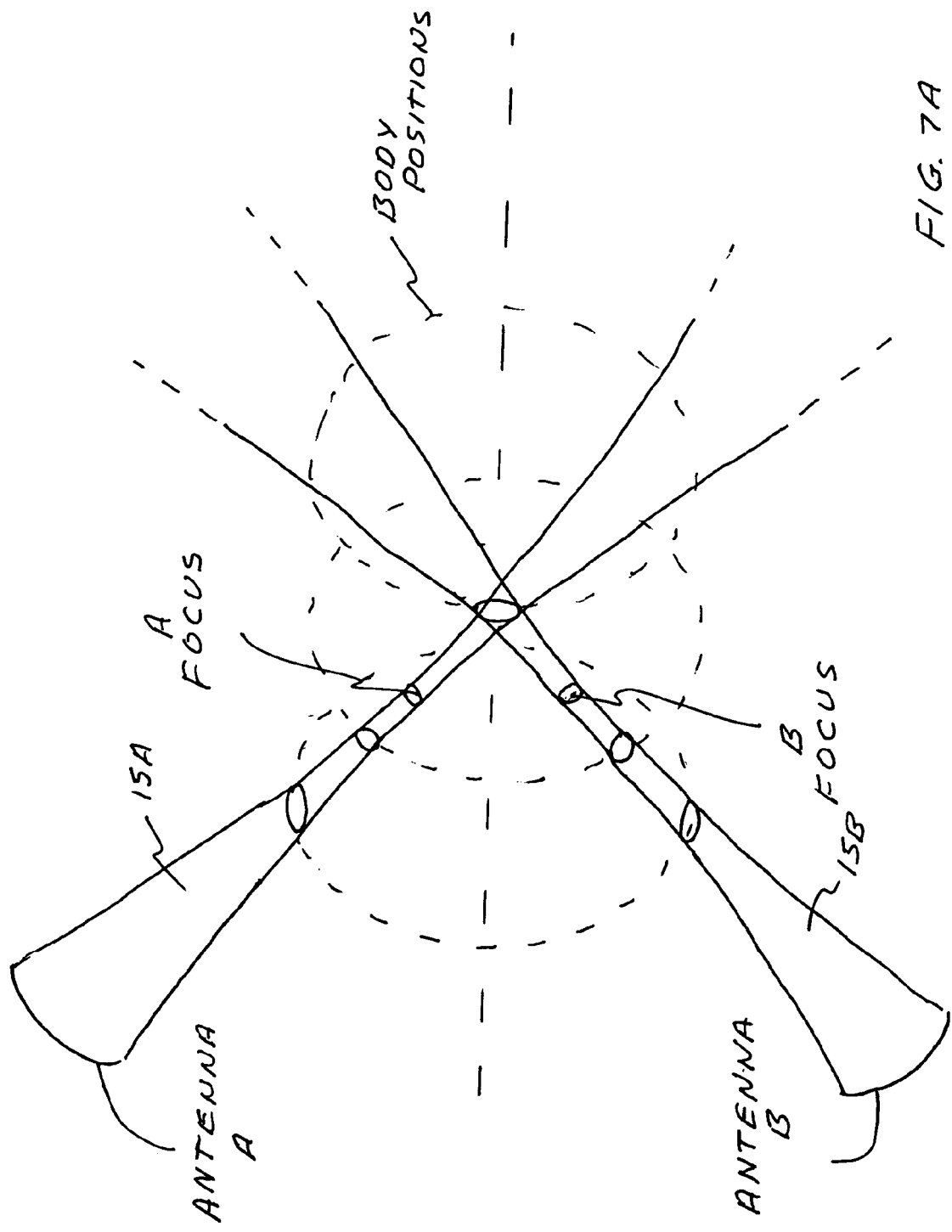
FIGS. 7A and 7B show the relationship between resolution and distance between antenna and target.
Figure 7B:
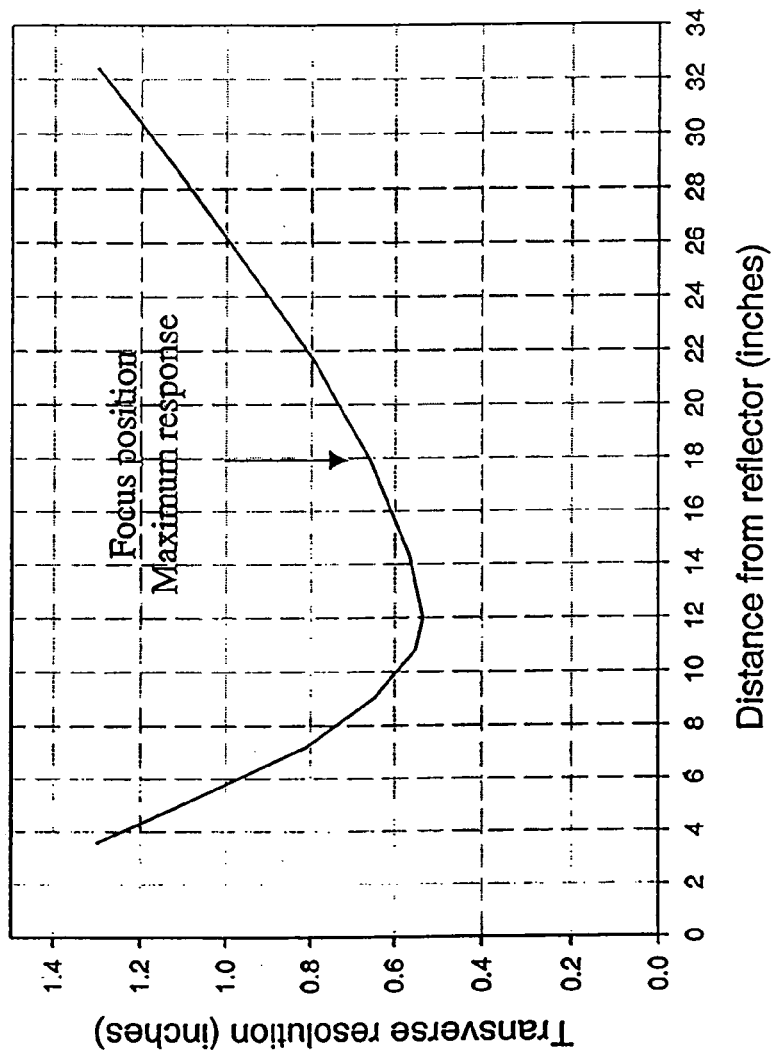

Various tradeoffs are possible in the selection of the focal position of the antenna elements. Positioning the antenna optically farther away from the persons being screened and increasing the focal length can provide greater depth of focus of the antenna elements. This can be done with mirrors 61 as shown in FIG. 6 to keep the unit compact. FIGS. 7A and 7B provide estimates of the approximate transverse resolution of the antenna as a function of distance of the between the surface being imaged and the antenna elements. Beam widths of antennas A and B are shown at 15A and 15B respectively in FIG. 7A. The foci of the two beams are shown at A FOCUS and B FOCUS. A person approximate body position is shown with dashed lines at three positions as he passes through the portal. FIG. 7B is a graph showing the resolution of an elliptical cylinder antenna.

Images

The 4 multi-angle views may be combined to present a 3d wire frame image. These views can be combined using overlapping stereoscopic image processing, or can be combined by utilizing additional information from the portal, such as the data from a visual or an infrared camera, and or including illumination lines for contour recognition. If the wire frame resolution is purposely limited the privacy issues associated with anatomical features can be minimized. Since we have the necessary temperature information to identify those areas with anomalous temperatures, the wire frame detail can be enhanced in those areas along with the display of the temperature data.

Reducing Noise

In thermal imaging systems, thermal resolution is often increased by "binning" multiple pixels to decrease noise by the square root of the number of pixels binned. Unfortunately, these systems may have pixels that exhibit a wide range of different noise characteristics. In the situation where there is a noisy pixel adjacent to a "quiet" pixels, when they are binned the resulting image may appear noisier then the starting image. This is caused by the severe degradation of the "quiet" pixels, which over powers the reduction in noise on the noisy pixel. The most straight forward approach is to do a weighted pixel binning whereby the amount of the pixel value added into the bin is inversely proportional to the expected noise on the pixel. An example of this would be as such, assume that in a group of 4 pixels the lowest noise pixel is given an addition value of 1. The other three pixels would be given values less than 1 based on their relative noise. This could be either a simple linear arrangement whereby, a twice as noisy pixel gets ½ the addition value, or a more complex function or even a non linear function. The pixel values are then added proportionally based on their addition value, with the normalization being based on the sum of the "addition values". This effectively bins the pixels without ever increasing the apparent noise on any pixel.

Since thermal images have a limited modulation transfer function (MTF), it is very rare to see any drastic discontinuity between pixels. In fact a multidimensional (2 orthogonal, and/or 2 at 45 degrees) cubic spline interpolation successfully fits most of the pixel values within such an image. There are other interpolation techniques besides the cubic spline which may also be used to optimize for the expected image's frequency components (adding additional orders to the curve fit allows more flexibility in dealing with more transitions in the image).

Assuming any of these techniques are used, multiple pieces of information are available about any pixel:
1. Its value (which may be derived from the weighted binning approach above).
2. Its error bars, the range of expected deviation given a certain probability (+−3 sigma=99%).
3. Its predicted value based on interpolation from the surrounding neighborhood of pixels. (note this includes pixels beyond the immediately adjacent pixels).
4. Probability of the predicted value based on the noise of the pixels used in the interpolation.
5. The trend (slope) of pixel intensity. e.g. the interpolation methods almost invariably are going to under predict intensity gradients.

Using this information the image pixel value can be assigned by a number of different methods that result in a lower noise image. E.g. the probability band of the pixel value may be combined with the probability of the predicted interpolation value to give the pixel its most likely value. Or in the case where the pixel's value and expected error lies outside of the predicted interpolation value, and is in the direction of the pixel intensity trend/slope, the most likely pixel value can be weighted more significantly towards the actual pixel value.

Cooled Background Posts

If the portal antennas have no person within the fields of view their are looking at the background beyond the focal point. To remove confusion from the image and make it easy to detect both the presence of a person and the presence of threats on a person, a controlled temperature posts positioned to complete the input and output squares can be used. The low cost post shown below has a temperature below background or above human temp (98.6 F). It can be used both to calibrate the systems offset and to distinguish natural gaps in the image such as that seen under the arm, from a threats e.g. bombs carried under the arm. A single temperature post provides offset information for calibration and can be combined with the data from people passing through to provide a type of two-point calibration to minimize gain variations within the system. If such a post were capable of providing both a lower and higher temperature in rapid oscillation it would allow continuous external two-point calibration of the system. The single temperature post relies on a Peltier cooler to create a temperature differential between a hot plate and a cold plate. Since very little of the energy used is radiated in the millimeter wave region the total energy requirements can be kept low. A cross sectional diagram is shown below. The Peltier cooler creates a temperature differential between the hot plate and the cold plate. The millimeter wave absorber provides a cold emitter of millimeter waves, and conduction and radiation at other frequencies is blocked by the insulation. Most common of the common insulation foams such as styrene, polyethylene e are transparent in the millimeter wave region. A foil layer is incorporated within the insulation between the hot and cold plates to minimize energy transfer by radiation. A two temperature post can be built with the addition of a millimeter wave absorber on the hot side. In the simplest configuration this would be an absorber directly bonded to the hot plate, in an alternate configuration the absorber might well be separated from the hotplate and have heated airflow from the hot plate on both sides. To obtain two-temperature calibration data from the post, it is rotated on a continuous basis at a speed such that the modulated temperature that the portal sees is modulated faster than the expected amplifier and electronic drifts. To achieve power transmission through the post without the necessity of slip rings and brushes the rotating motion of the post can be taken advantage of. In such a scheme the post includes both a motor and a generator. The motor would rotate the post which in turn is part of a stator assembly that could be used to generate the power necessary to operate the thermal peltier coolers. A complete brushless system can be created with today's technologies.

Alternate Frequency Processors

Preferred embodiments of the present invention use a beam forming technology similar to the Rotman lens to do real time frequency and phase separation. This allows Applicants to effectively multiplex the expensive low noise amplifiers between many pixels. In the portal the imaging optics uses a frequency scanned wave guide antenna. The resolution of the angular pixels is accomplished by separating the broadband signal into its separate frequency components with our beam forming technology. There are other methods to separate this signal. In general if fewer pixels (frequencies) are needed, these methods become more competitive, and as more pixels are added they become unwieldy. The most obvious alternative method for frequency processor which does not rely on beam forming are different applications of filtering. One approach is to use a series of individual band pass filters. Millimeter wave band pass filters may be created with a number of different techniques, a coupled line band pass filter is shown below. In this approach each frequency would have its own band pass filter and the broadband input signal would have taps for each of the filters. Some additional efficiency could be achieved by tuning the broadband taps to the frequency range of the following band pass filter. An alternative approach is to use a series of low pass or high pass filters, such that each tap represents the signal of that pixel and the subsequent pixels. By subtracting out the sequence a signal for each pixel can be derived; e.g., assume five pixels and series of five sequential low pass filters. The first tap represents P1+P2+P3+P4+P5, the last tap represents P5, thus you have five variables and five linear equations which is easily solved either digitally or with analog techniques. This technique requires a method of proportionally tapping off the signal as it progresses down through the series of band pass filters, there are a number of different methods of achieving this goal.

Pixel on a Chip

Another alternative is a millimeter wave detector that combines all high frequency components within a compact package such that the only external interfacing signals are the incident radiation and the low frequency electronic controls and output signal. Millimeter wave imaging systems rely on a variety of high-frequency components that are electro-magnetically coupled with wave-guides. Because of the wave-guide constraints and the transition losses and requirements (from strip-lines to air spaced wave guides), the packages are inherently bulky and expensive thus architectures are designed to minimize the high frequency millimeter wave components. By combining all these functions into one compact low cost package many advantages can be realized. Also, the total gain requirements of the system are reduced as there no longer any losses associated with the transitions. For some applications such as a security portal scanner the desired detector configuration is a linear array. This array needs pixel elements that are approximately one wavelength (3 mm at 90 GHz) apart along the array. This puts a one dimensional spacing constraint on any design architecture that uses a fixed focal plane linear array.

The proposed device is a pixel on a chip. It contains all the high frequency components in one package, including the antenna and the detector diode. The functional block diagram of the device is shown below. Certain functional blocks might well be combined into a multi-block device on the waver prior to packaging. The overall package is dimensioned to allow at least a 3 mm linear spacing along one axis. The millimeter signal is incident on the package at the dipole antenna. The antenna is one of the inputs to a two-way switch. The other input of the switch is a dummy load with a controllable heater to allow differential signal processing whereby the device background temperature noise is subtracted from the signal. This is a method for dealing with fast temporal changes in the high frequency amplifier gains. The heater provides a method of calibrating out longer term amplifier gain variations. The first stages of the high-frequency, low-noise amplifier, amplify the input millimeter wave signal above the noise threshold. The band-pass filter limits the millimeter wave frequencies that are passed through to the high gain second stage amplifier. The second stage amplifiers provide enough gain to raise the signal level up to the detector diode sensitivity. The detector diode converts the high frequency millimeter wave signal to a low dc frequency amplitude signal. The analog processing circuitry provides the necessary dc signal levels to allow transition to the signal processing interconnects off the chip. Some parts of the analog signal processing can optionally be handled within the chip, these could include: integration and background subtraction.

While the present invention has been described above in terms of particular embodiments, persons skilled in the art will recognize that many other changes may be made. For example, improved millimeter wave images can be obtained by reducing illumination from warm bodies of a subject under examination and by increasing the illumination from the cold sky. Large metal reflectors may be positioned so as to block illumination of the subject from warm emitters (such as the ground, buildings and trees) and so that the subject is illuminated either directly or indirectly almost entirely from the cold sky. A sniffer system for the detection of explosives could be included in the portal design. The dimensions of the portal can be varied as desired. For example, Applicants are building a prototype portal unit 24 inches wide with the antennas focused at 12 inches. The embodiment described in detail above has the detectors scanning from approximately horizontal to about 21 degrees below horizontal. By turning the detectors up-side-down they would scan from about horizontal to about 21 degrees above horizontal. This could be an advantage to detecting objects hidden in armpits and groin regions. Infrared or visible cameras synchronized with the millimeter wave screener may be adapted to provide correlated identity and reference information. Better resolution could be achieved by providing automatic focusing of the antenna elements. Alternatively, additional sets of elements could be provided with various focal lengths with processor software programmed to select the best focus for each portion of the target person as he/she passes through the portal. Increasing the size of the antenna could also improve the resolution. The person passing through the portal could be rotated before a single stack or they could be rotated before the four stacks. For applications where plenty of screening time is available a single element or fewer elements could be scanned across a person being screened, either automatically or by hand. Modifications to the amplifier shown in FIG. 4 could be made but preferably gains of at least 50 dB should be provided. Therefore, the scope of the present invention should be determined by the appended claims and their legal equivalents.

We claim:

1. A millimeter wave portal imaging system for the detection of concealed weapons, explosives and other contraband items, said system comprising:
   A) a portal structure;
   B) a plurality of millimeter wave detection units mounted in said portal structure, each unit comprising,
      1) a frequency scanning antenna defining an antenna field of view,
      2) at least one low-noise amplifier for amplifying millimeter wave radiation detected by said antenna to produce an amplified millimeter wave signal,
      3) a tapped-delay beam-former for separating said amplified millimeter wave signal into frequency dependent bins,
   C) a data processor means programmed to sample said frequency dependent bins of at least a plurality of said detection units and to produce one or more images of objects carried under clothing by persons passing through said portal structure.

2. The system as in claim 1 and further comprising at least one monitor for displaying said images.

3. The system as in claim 2 wherein said data processor means is further programmed to produce at least one image of bodies of said persons displaying, in said at least one image, said objects.

4. The system as in claim 1 wherein each of said plurality of detection units detect a one dimensional image of a portion of said persons in a narrow, approximately vertical focused field of view and two-dimensional sub images are obtained by movement of said person horizontally across said narrow focused field of view.

5. The system as in claim 1 wherein said portal structure comprises four posts in which the millimeter wave detector units are mounted.

6. The system as in claim 1 wherein said millimeter wave detector units are configured to scan in a frequency range comprising the range of about 75.5 to 93.5 GHz.

7. The system as in claim 1 wherein each of said millimeter wave detector units comprise a cylindrical reflector system.

8. The system as in claim 1 wherein each of said millimeter wave detector units comprise a cylindrical Cassegrain-type reflector system.

9. The system as in claim 1 and further comprising a nuclear quadrupole resonance detector.

10. The system as in claim 1 and further comprising a metal detector.

11. The system as in claim 1 wherein each of said beamformers in each of said detector units comprises:
   1) a plurality of delay lines,
   2) a millimeter wave lens, and
   3) a plurality of millimeter wave power detectors.

12. The system as in claim 1 wherein each of said low noise amplifier comprises three MMIC amplifiers fabricated on an indium phosphate substrate and a band pass filter.

13. The system as in claim 11 wherein said delay lines define copper surfaces having surface roughness less than 300 nanometers.

14. The system as in claim 1 and further comprising a sniffer system for detecting explosives.

15. A hybrid portal concealed weapon and contraband imaging and detection system comprising:

A) a nuclear quadrupole resonance detector, and
B) a portal contraband screener comprising a plurality of millimeter wave sensors, each of said plurality of millimeter wave sensors comprising:
   1) at least one millimeter wave frequency scanning antenna for collecting frequency dependent beams of millimeter wave radiation from a narrow one-dimensional field of view;
   2) a fast switch for calibration;
   3) a millimeter wave amplifier for amplifying at the collected frequencies said millimeter wave radiation, said amplifier comprising at least three MMIC amplifiers fabricated on an indium phosphate substrate and a band pass filter;
   4) a beam-former for separating said amplified collected radiation to produce frequency dependent signals corresponding to said frequency dependent beams, said beam-former comprising:
      a) a plurality of delay lines,
      b) a millimeter wave lens, and
      c) a plurality of millimeter wave power detectors; and
   5) a sampling circuit for reading out frequency dependent signals to produce a one-dimensional image of the antenna field of view, and
   6) focusing means for focusing the sensor.

* * * * *